(12) United States Patent
Li

(10) Patent No.: US 12,504,007 B2
(45) Date of Patent: Dec. 23, 2025

(54) INFLATION APPARATUS

(71) Applicant: HAINAN ZEBIN TECHNOLOGY TRADING CO., LTD., Hainan (CN)

(72) Inventor: Shijie Li, Hainan (CN)

(73) Assignee: HAINAN ZEBIN TECHNOLOGY TRADING CO., LTD., Hainan (CN)

( * ) Notice: Subject to any disclaimer, the term of this patent is extended or adjusted under 35 U.S.C. 154(b) by 0 days.

(21) Appl. No.: 18/702,804

(22) PCT Filed: Feb. 2, 2024

(86) PCT No.: PCT/CN2024/075562
§ 371 (c)(1),
(2) Date: Apr. 19, 2024

(87) PCT Pub. No.: WO2025/138395
PCT Pub. Date: Jul. 3, 2025

(65) Prior Publication Data
US 2025/0230804 A1    Jul. 17, 2025

(30) Foreign Application Priority Data
Dec. 29, 2023 (CN) .......................... 202311861590.2

(51) Int. Cl.
| F04B 33/00 | (2006.01) |
| F04B 39/10 | (2006.01) |
| F04B 39/12 | (2006.01) |
| F04B 43/08 | (2006.01) |
| F04B 43/12 | (2006.01) |

(52) U.S. Cl.
CPC .............. *F04B 33/00* (2013.01); *F04B 39/10* (2013.01); *F04B 39/123* (2013.01); *F04B 43/084* (2013.01); *F04B 43/12* (2013.01)

(58) Field of Classification Search
CPC ......... F04B 33/00; F04B 39/123; F16K 15/20
See application file for complete search history.

(56) References Cited

U.S. PATENT DOCUMENTS

| 5,230,611 | A | * | 7/1993 | Shelton | .................... | F04B 33/00 |
| | | | | | | 417/437 |
| 5,556,258 | A | * | 9/1996 | Lange | ..................... | F04B 33/00 |
| | | | | | | 417/63 |
| 6,990,994 | B2 | * | 1/2006 | Reeb | ...................... | F16K 15/205 |
| | | | | | | 137/232 |
| 10,697,555 | B2 | * | 6/2020 | Dupré | .................... | F16K 15/205 |
| 10,781,929 | B2 | * | 9/2020 | Konantambigi | ...... | F16K 15/063 |
| 2012/0285552 | A1 | * | 11/2012 | Song | ....................... | F16K 15/20 |
| | | | | | | 137/223 |

(Continued)

FOREIGN PATENT DOCUMENTS

| CN | 101059199 A | * | 10/2007 |
| CN | 102182669 A | * | 9/2011 |

(Continued)

*Primary Examiner* — Thomas E Lazo
(74) *Attorney, Agent, or Firm* — JCIPRNET

(57) ABSTRACT

An inflation apparatus, including an inflation bag and an inflation tube configured to be mounted on a to-be-inflated product; one end of the inflation bag being disposed to be open; and the other end thereof being provided with a connecting nozzle used for being engaged with the inflation tube; and a non-return mechanism is provided inside the inflation tube.

8 Claims, 4 Drawing Sheets

(56) References Cited

U.S. PATENT DOCUMENTS

| | | | | |
|---|---|---|---|---|
| 2015/0037113 A1* | 2/2015 | Maness | ............... | B60P 7/065 |
| | | | | 137/232 |
| 2020/0224648 A1* | 7/2020 | Bais | ............... | F04B 39/123 |
| 2021/0361054 A1* | 11/2021 | Huang | ............... | F04B 33/00 |
| 2022/0282734 A1* | 9/2022 | Huang | ............... | F04B 39/121 |

FOREIGN PATENT DOCUMENTS

| | | | | | |
|---|---|---|---|---|---|
| CN | 104481853 A | * | 4/2015 | | |
| CN | 108302228 A | * | 7/2018 | ............ | B01D 35/04 |
| GB | 2350409 A | * | 11/2009 | ............ | F04B 33/00 |
| GB | 2512338 B | * | 2/2016 | ............ | F04B 33/00 |

\* cited by examiner

INFLATION APPARATUS

CROSS-REFERENCE TO RELATED APPLICATION

This application is a 371 of international application of PCT application serial no. PCT/CN2024/075562, filed on Feb. 2, 2024, which claims the priority benefit of China application no. 202311861590.2, filed on Dec. 29, 2023. The entirety of each of the above-mentioned patent applications is hereby incorporated by reference herein and made a part of this specification.

TECHNICAL FIELD

The present disclosure relates to the technical field of inflation devices, in particular to an inflation apparatus.

TECHNICAL BACKGROUND

In daily life, there may be a plurality of products that need to be inflated, such as swimming rings, lifebuoys, floating beds, and air mattresses. Although these inflatable products are convenient for users when in use, inflation steps performed before use often bring trouble for users.

Existing inflation methods basically include directly blowing air with the mouth of a user, using an electric inflation pump (or air compressor), and using a manual inflation pump. Directly blowing air with the mouth of the user is not only low in inflation efficiency, but also makes the user feel very tired. The electric inflation pump needs a power supply when being used, and a battery power supply has a risk that a battery is used up. However, an electric inflation pump externally connected to a power supply requires the user to find a stable power supply, which is very inconvenient to use outdoors. A plurality of inflatable products need to be used outdoors, and therefore, the existing inflation methods are difficult to satisfy demands on outdoor use; and although it is unnecessary to consider the problem of the power supply, the manual inflation pump is usually time-consuming and laborious during use.

An existing hand-operated inflation pump includes an air cylinder and a push rod disposed in the air cylinder. One end of the push rod is connected with a piston, and the air cylinder is provided with a one-way air inlet valve and a one-way air outlet valve. The other end of the push rod is connected with a rack frame. Both sides of an inner wall of the rack frame are provided with two rows of racks. A semicircular gear is disposed between the two rows of racks, and the semicircular gear can only be meshed with the racks on single side. The outside of the rack frame is slidably sleeved with a gear box, and the semicircular gear is connected to the gear box by a rotating shaft.

The above-mentioned existing inflation pumps still have the defect that an inflation process is time-consuming and laborious.

SUMMARY OF THE INVENTION

In order to overcome the defect of the above-mentioned inflation pump in the prior art that the inflation process is time-consuming and laborious, the present disclosure provides an inflation apparatus.

In order to solve the above-mentioned technical problems, the present disclosure adopts the following technical solutions: an inflation apparatus, including an inflation bag and an inflation tube configured to be mounted on a to-be-inflated product; one end of the inflation bag being disposed to be open, and another end of the inflation bag being provided with a connecting nozzle used for being engaged with the inflation tube; and a non-return mechanism being provided inside the inflation tube.

During use, the connecting nozzle is connected to the inflation tube; then, hold the opening of the inflation bag and shake the inflation bag, so that the inflation bag is filled with air; then, the opening of the inflation bag is sealed, so that the air is prevented from escaping through the opening of the inflation bag; then, the inflation bag is squeezed along a direction from the opening to the connecting nozzle, so that the air in the inflation bag enters the to-be-inflated product through the inflation tube. As the non-return mechanism is provided inside the inflation tube, the air inflated into the to-be-inflated product cannot escape from the inflation tube during inflation.

Further, the inflation tube and the connecting nozzle are provided with a clamping assembly, and the connecting nozzle is clamped to the inflation tube by the clamping assembly.

Further, the clamping assembly includes a flange and clamping jaws; the flange is disposed on an outer side wall of the inflation tube; and the clamping jaws configured to be clamped on the flange are provided on the connecting nozzle.

Further, the non-return mechanism includes a spacer plate and a plugging assembly; the spacer plate is provided with inflation inlets; the plugging assembly is disposed on the spacer plate; when no airflow is introduced to the inflation tube, the plugging assembly is in a state of plugging the inflation inlets; and when an airflow is introduced to the inflation tube, the plugging assembly is out of the state of plugging the inflation inlets.

Further, the plugging assembly includes a valve element, an elastic member, and an elastic sheet; a through opening is formed in the spacer plate; the valve element penetrates into the through opening, the elastic sheet is disposed on the bottom of the valve element, one end of the elastic member is connected to the top of the valve element, and the other end thereof is disposed on the spacer plate; and when the elastic member is not subjected to an external force, the valve element enables the elastic sheet to be kept in a state of plugging the through opening under the action of an elastic force of the elastic member.

Further, the plugging assembly further includes a protruding ring disposed on the bottom of the spacer plate, the through opening and the inflation inlets are both located in the protruding ring, and the elastic sheet abuts against the protruding ring.

Further, the elastic member is a spring; the valve element is sleeved by the elastic member; the top of the valve element is provided with a pressing plate, and the cross-sectional area of the pressing plate is greater than the cross-sectional area of the valve element; one end of the elastic member abuts against the pressing plate, and another end of the elastic member abuts against the spacer plate.

Further, the connecting nozzle includes an inserting part and a limiting part; the clamping jaws are disposed on an outer side wall of the limiting part; the limiting part is located on an outer side of the inserting part; and when the connecting nozzle is connected to the inflation tube, the inserting part inserts into the inflation tube, and the limiting part abuts against the top of the inflation tube.

Further, the inflation tube is connected with a plug for plugging the inflation tube; the inflation tube is further provided with a pressing member which is an elastic pressing member, and a diameter of the pressing member is greater than a diameter of the inflation tube.

Further, a protective cover is disposed below the elastic sheet, and the elastic sheet is located in the protective cover; and a window is formed in the protective cover.

Compared with the prior art, the present disclosure has the follow beneficial effects:

1. air is collected by means of an open inflation bag, the inflation bag can be filled with air by only holding an opening of the inflation bag and swinging and shaking the inflation bag, and then, the inflation bag is squeezed along a direction from the opening to the connecting nozzle, so that the air in the inflation bag can enter the to-be-inflated product through the inflation tube, there are no needs for power supplies, or performing manual repeated pressing (or squeezing), or manual air blowing, and the inflation apparatus has a high inflation efficiency, a labor-saving inflation process, and is suitable for outdoor use;
2. the inflation inlets are plugged by using the elastic member and the elastic sheet, when air is introduced to the inflation tube, an airflow will jack up the elastic sheet, so that a gap is formed between the elastic sheet and the inflation inlets, and at the moment, the air can pass through the gap and enter the to-be-inflated product through the inflation inlets, thereby achieving the effect of inflation into an inflatable product by the inflation tube without additional manual intervention; and when no air is introduced to the inflation tube, the valve element drives the elastic sheet to plug the inflation inlets under the action of the elastic force of the elastic member, and then, the gas in the inflatable product can be stopped from escaping; and
3. when the inflatable product needs to be deflated, a force is applied to the pressing member to make the pressing member deform so that the pressing member can be inserted to the inflation tube until the pressing member pushes the valve element such that the elastic sheet is out of the state of plugging the through opening; then, the force applied to the pressing member is canceled, and at the moment, the pressing member tries to restore to an initial state due to its elastic force, while the diameter of the pressing member is greater than that of the inflation tube, so that the pressing member can be clamped in the inflation tube and maintained in the current deformed state, then, the through opening is maintained in an open state all the time, and at the moment, the user can press or squeeze the inflatable product to make the gas therein escape from the inflation tube; during deflation, the inflation tube can be kept in the open state without continuous intervention operation from the user, so that convenience and labor saving are achieved; and the pressing member is connected to the inflation tube so as to be convenient for the user to find and use.

Figure 1:
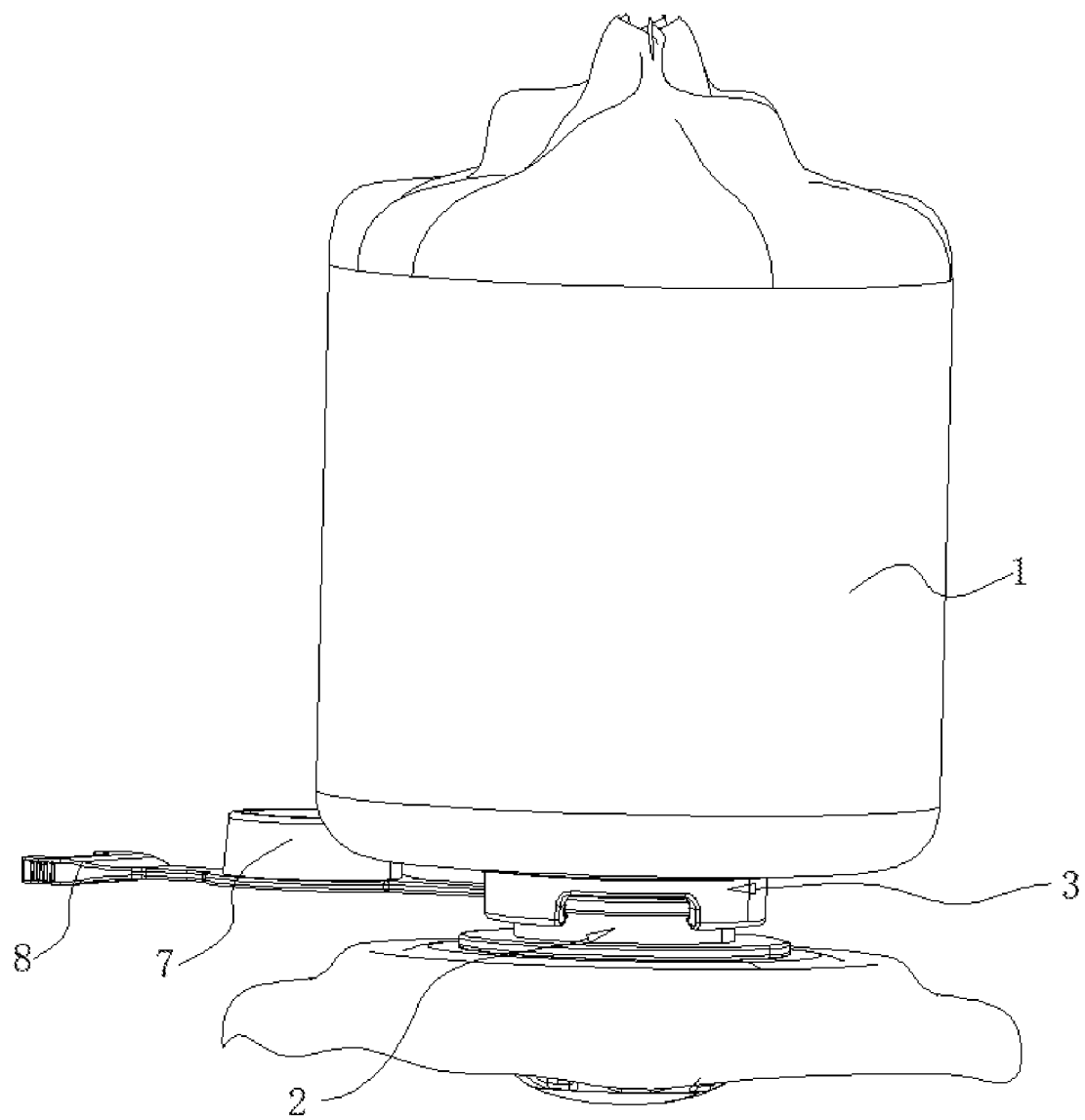
FIG. 1 is a schematic diagram of an overall structure in an embodiment of an inflation apparatus provided in the present disclosure.
Figure 2:
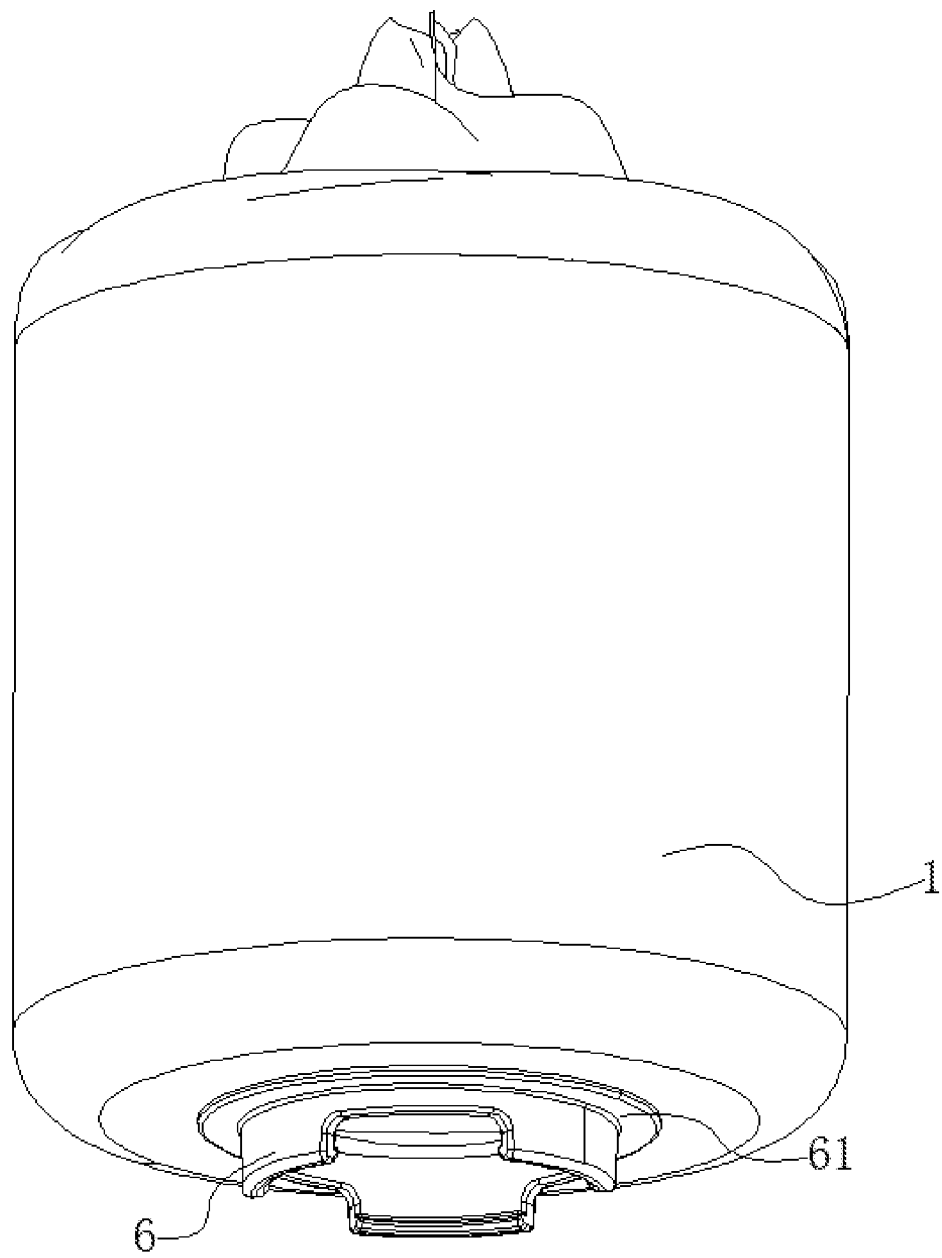
FIG. 2 is a schematic structural diagram of an inflation bag and a connecting nozzle in an embodiment of an inflation apparatus provided in the present disclosure.

In the accompanying drawings: 1, inflation bag; 2, inflation tube; 3, connecting nozzle; 31, inserting part; 32, limiting part; 4, non-return mechanism; 41, spacer plate; 411, through opening; 412, inflation inlet; 42, plugging assembly; 421, valve element; 422, elastic member; 423, elastic sheet; 424, protruding ring; 425, pressing plate; 5, flange; 6, clamping jaw; 61, connecting sheet; 7, plug; 8, pressing member; 9, protective cover; and 91, window.

DETAILED DESCRIPTION OF THE INVENTION

The accompanying drawings are only for the purpose of exemplary description, but cannot be understood as limitations on the present patent. In order to better describe the present embodiments, some components in the accompanying drawings will be omitted, enlarged or reduced, which does not represent the size of an actual product. For the skilled in the art, it can be understood that some known structures or descriptions in the accompanying drawings may be omitted. Positional relationships described in the accompanying drawings are only for the purpose of exemplary description, but cannot be understood as limitations on the present patent.

The same or similar reference numerals in the accompanying drawings of the embodiments of the present disclosure correspond to the same or similar components. In the description of the present disclosure, it should be understood that directional or positional relationships indicated by terms such as "upper", "lower", "left", "right", "long" and "short" are based on directional or positional relationships as shown in the accompanying drawings, and are only for the purposes of facilitating describing the present disclosure and simplifying the description, rather than indicating or implying that the referred apparatus or element has to have a specific direction or be constructed and operated in the specific direction, and therefore, the terms for describing the positional relationships in the accompanying drawings are only used for exemplary description, but cannot be regarded as limitations on the present patent. Those of ordinary skill in the art may understand the specific meanings of the above-mentioned terms according to specific conditions.

The technical solutions of the present disclosure will be further specifically described below with specific embodiments in conjunction with the accompanying drawings.

Embodiment 1

With reference to FIG. 1 to FIG. 5, shown is embodiment 1 of an inflation apparatus provided in the present disclosure, including an inflation bag 1 and an inflation tube 2 configured to be mounted on a to-be-inflated product; one end of the inflation bag 1 being disposed to be open, and another end of of the inflation bag 1 is provided with a connecting nozzle 3 used for being engaged with the inflation tube 2; and a non-return mechanism 4 is provided inside the inflation tube 2.

Specifically, the inflation bag 1 may be made of one of materials: PVC, TPU, EVA, and ABS, and is preferably made of material TPU in the present embodiment. The inflation bag 1 is cylindric after being filled with air; the connecting nozzle 3 is mounted on the bottom of the inflation bag 1; the top of the inflation bag 1 is open, and the opening is formed by a cross section of a top end of the inflation bag 1. During use, the connecting nozzle 3 is connected to the inflation tube 2; then, hold the opening of the inflation bag 1, and shake the inflation bag 1, so that the inflation bag 1 is filled with air; then, the opening of the inflation bag 1 is sealed, and the opening can be sealed by directly holding the opening with a hand of a user or using a rubber string or rope, etc., to prevent the air from escaping through the opening of the inflation bag 1; then, the inflation bag 1 is squeezed along a direction from the opening to the connecting nozzle 3, so that the air in the inflation bag 1 enters the to-be-inflated product through the inflation tube 2; and the non-return mechanism 4 is provided inside the inflation tube 2, so that the air inflated into the to-be-inflated product cannot escape from the inflation tube 2 during inflation.

In the present embodiment, the inflation tube 2 and the connecting nozzle 3 are provided with a clamping assembly, and the connecting nozzle 3 is clamped to the inflation tube 2 by the clamping assembly. The connecting nozzle 3 is connected to the inflation tube 2 by the clamping assembly, so that the connecting nozzle 3 and the inflation tube 2 can be kept in a relatively stable connection state during inflation.

In the present embodiment, the clamping assembly includes a flange 5 and clamping jaws 6; the flange 5 is disposed on an outer side wall of the inflation tube 2; and the clamping jaws 6 configured to be clamped on the flange 5 are disposed on the connecting nozzle 3. The connecting nozzle 3 includes an inserting part 31 and a limiting part 32; the clamping jaws 6 are disposed on an outer side wall of the limiting part 32; the limiting part 32 is located on an outer side of the inserting part 31; and when the connecting nozzle 3 is connected to the inflation tube 2, the inserting part 31 inserts into the inflation tube 2, and the limiting part 32 abuts against the top of the inflation tube 2.

Specifically, the inserting part 31 is composed of an annular sheet and a hollow cylinder; the limiting part 32 is located on an outer side of a cylinder portion of the inserting part 31; the limiting part 32 is an annular boss, and the limiting part 32 and the inserting part 31 are integrally formed. The clamping jaws 6 are shaped like square blocks; the clamping jaws 6 may be made of materials such as TPU, ABS, PVC, etc., and are preferably made of material TPU, and bottom ends of the square blocks protrude towards the inserting part 31, thereby forming the clamping jaws 6. A plurality of clamping jaws 6 are provided; the plurality of clamping jaws 6 are disposed on the bottom of an annular connecting sheet 61 and are annularly arranged; a gap is formed between every two adjacent clamping jaws 6, and the inflation bag 1 is clamped between the connecting sheet 61 and the top of the inserting part 31 and is fixed by means of hot melting. A diameter of the flange 5 is the same as a diameter of a ring formed by the plurality of clamping jaws 6, but is slightly greater than a diameter of a ring formed by protrusions on the bottom ends of the clamping jaws 6. When the connecting nozzle 3 is clamped to the inflation tube 2, the inserting part 31 inserts into the inflation tube 2, and then, a force is applied to the connecting nozzle 3, so that the clamping jaws 6 deform to expand, and the flange 5 can pass through the protrusions of the clamping jaws 6 until the limiting part 32 abuts against the top of the inflation tube 2; that is, it is proven that the connecting nozzle 3 is engaged in place with the inflation tube 2, and at the moment, the force applied to the connecting nozzle 3 can be canceled, and the clamping jaws 6 restore to initial shapes. At the moment, the protrusions on the tops of the clamping jaws 6 can move to the bottom of the flange 5, at the moment, the flange 5 are clamped to the clamping jaws 6, and then, clamping between the connecting nozzle 3 and the inflation tube 2 is realized. The arrangement that the inserting part 31 inserts into the inflation tube 2 and the arrangement that the limiting part 32 abuts against the inflation tube 2 are both for the purpose of reducing gaps when the connecting nozzle 3 is clamped to the inflation tube 2, thereby reducing escaping loss caused when an airflow flows from the inflation bag 1 to the inflation tube 2.

In the present embodiment, the non-return mechanism 4 includes a spacer plate 41 and a plugging assembly 42; the spacer plate 41 is provided with inflation inlets 412; the plugging assembly 42 is disposed on the spacer plate 41; when no airflow is introduced to the inflation tube 2, the plugging assembly 42 is in a state of plugging the inflation inlets 412; and when an airflow is introduced to the inflation tube 2, the plugging assembly 42 is out of the state of plugging the inflation inlets 412.

The spacer plate 41 is coaxially disposed in the inflation tube 2; the spacer plate 41 and the inflation tube 2 are integrally formed; four arc-shaped inflation inlets 412 are formed in the spacer plate 41; a spacing is formed between the adjacent inflation inlets 412, thereby ensuring the strength of the spacer plate 41; and the plugging assembly 42 can stop the gas in an inflatable product from escaping by only plugging the inflation inlets 412, which is easier compared with plugging the overall inflation tube 2. When the airflow is introduced to the inflation tube 2, the plugging assembly 42 is out of the state of plugging the inflation inlets 412, excessive operations from a user are not needed, and therefore, convenience in use is achieved.

In the present embodiment, the plugging assembly 42 includes a valve element 421, an elastic member 422, and an elastic sheet 423; a through opening 411 is provided in the spacer plate 41; the valve element 421 penetrates into the through opening 411; the elastic sheet 423 is disposed on the bottom of the valve element 421, one end of the elastic member 422 is connected to the top of the valve element 421, and another end of the elastic member 422 is disposed on the spacer plate 41; and when the elastic member 422 is not subjected to an external force, the valve element 421 enables the elastic sheet 423 to be kept in a state of plugging the through opening 411 under the action of an elastic force of the elastic member 422.

Specifically, the through opening 411 is coaxially disposed in the spacer plate 41 and is circular; the valve element 421 is cylindric and movably penetrates into the through opening 411; the inflation inlets 412 are disposed around the through opening 411, and the four inflation inlets 412 are in an annular arrangement. The elastic sheet 423 is circular and is coaxially disposed on the bottom of the valve element 421, and the elastic sheet 423 is made of a rubber material. The top of the elastic sheet 423 is coaxially provided with an inserting rod which is coaxially and fixedly inserted in the valve element 421. Projections of the four inflation inlets 412 and of the through opening 411 in an axial direction are all covered by the elastic sheet 423, which ensures that the elastic sheet 423 can cover the inflation inlets 412 and the through opening 411.

In the present embodiment, the plugging assembly 42 further includes a protruding ring 424 disposed on the bottom of the spacer plate 41, the through opening 411 and the inflation inlets 412 are both located in the protruding ring 424, and the elastic sheet 423 abuts against the protruding ring 424.

Specifically, the protruding ring 424 is coaxially disposed on the bottom of the spacer plate 41, and the protruding ring 424 and the spacer plate 41 are disposed to be coaxial. When the elastic sheet 423 abuts against the protruding ring 424, that is, the inside of the protruding ring 424 is sealed, so that the through opening 411 and the inflation inlets 412 are plugged. Since the protruding ring 424 is of a raised structure, compared with direct fitting of the elastic sheet 423 to the spacer plate 41, the contact between the elastic sheet 423 and the protruding ring 424 approaches to linear contact, and thus, the sealing performance is better. When air is introduced to the inflation tube 2, the airflow will jack up the elastic sheet 423, so that a gap is formed between the elastic sheet 423 and the protruding ring 424, at the moment, the air can penetrate through the gap and enter the to-be-inflated product through the inflation inlets 412, thereby achieving the effect of inflating the to-be-inflated product through the inflation tube 2 without additional manual intervention; and when no air is introduced to the inflation tube 2, the valve element 421 drives the elastic sheet 423 to plug the inflation inlets 412 under the action of the elastic force of the elastic member 422, and then, the gas in the to-be-inflated product can be stopped from escaping.

In the present embodiment, the elastic member 422 is a spring; the elastic member 422 is sleeved on the valve element 421; the top of the valve element 421 is provided with a pressing plate 425, and the cross-sectional area of the pressing plate 425 is greater than the cross-sectional area of the valve element 421; one end of the elastic member 422 abuts against the pressing plate 425, and another end of the elastic member 422 abuts against the spacer plate 41.

Specifically, the bottom of the pressing plate 425 is provided with a cylinder, and the cylinder is inserted to the top of the valve element 421, so that the pressing plate 425 is connected to the valve element 421. An annular boss is disposed on a position, surrounding the through opening 411, on the top of the spacer plate 41, and a bottom end of the elastic member 422 abuts against the boss. The elastic member 422 is in a compressed state under a normal condition, so that the valve element 421 trends to move upwards under the action of the elastic member 422, and then, the elastic sheet 423 can tightly abuts against the protruding ring 424, which ensures the sealing between the elastic sheet 423 and the protruding ring 424. When deflation is needed, the user only needs to insert a finger or other articles into the inflation tube 2 until the pressing plate 425 is pressed, and to overcome the elastic force of the elastic member 422, so that the valve element 421 moves downwards until the elastic sheet 423 is separated from the protruding ring 424, and thus the gas in the inflatable product can be allowed to escape through the inflation inlets 412. The provided pressing plate 425 not only provides an abutting position for the top end of the elastic member 422, but also is convenient for the user to press.

Embodiment 2

Figure 3:
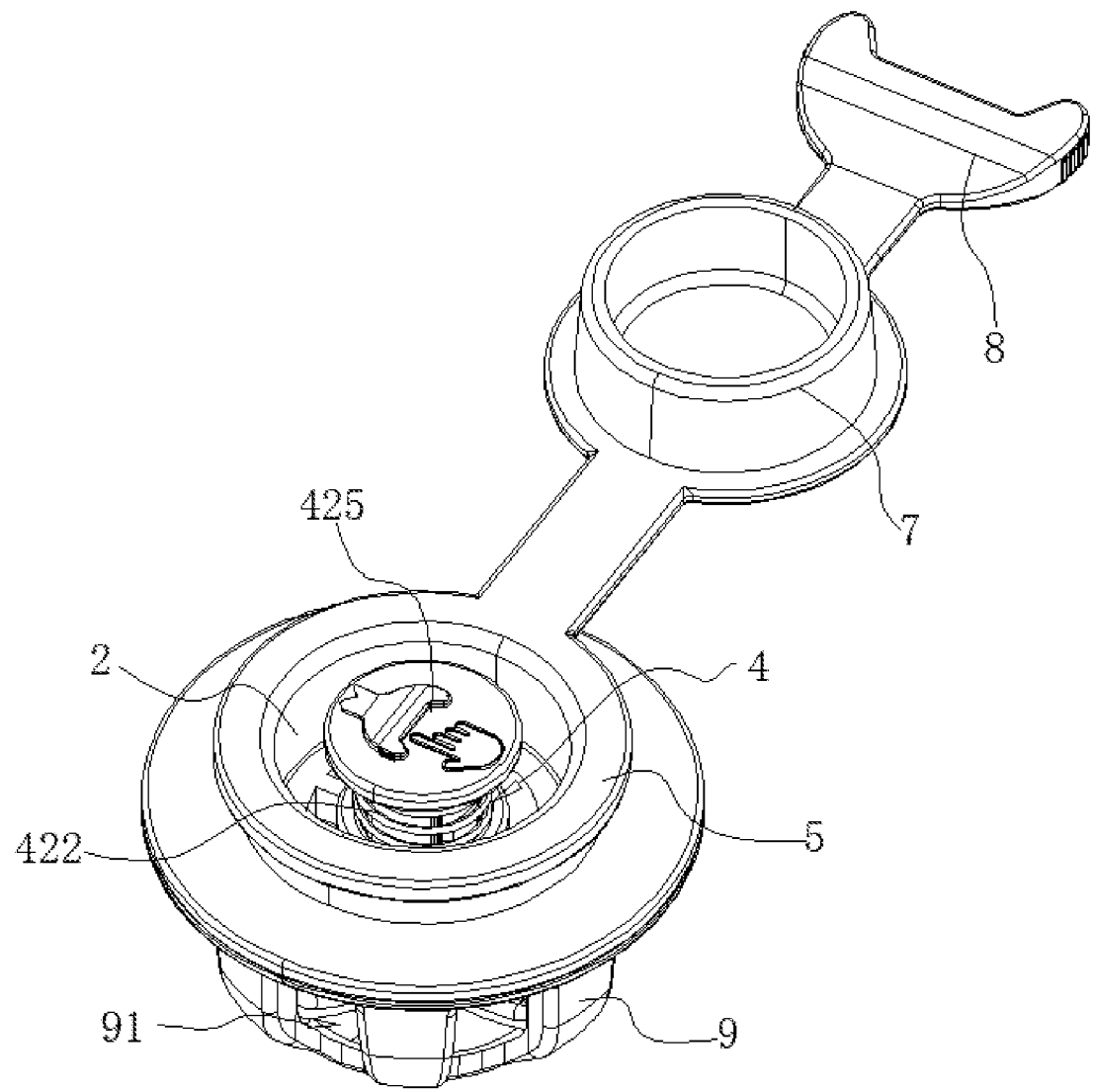
FIG. 3 is a schematic structural diagram of an inflation tube and a non-return mechanism in an embodiment of an inflation apparatus provided in the present disclosure.
Figure 4:
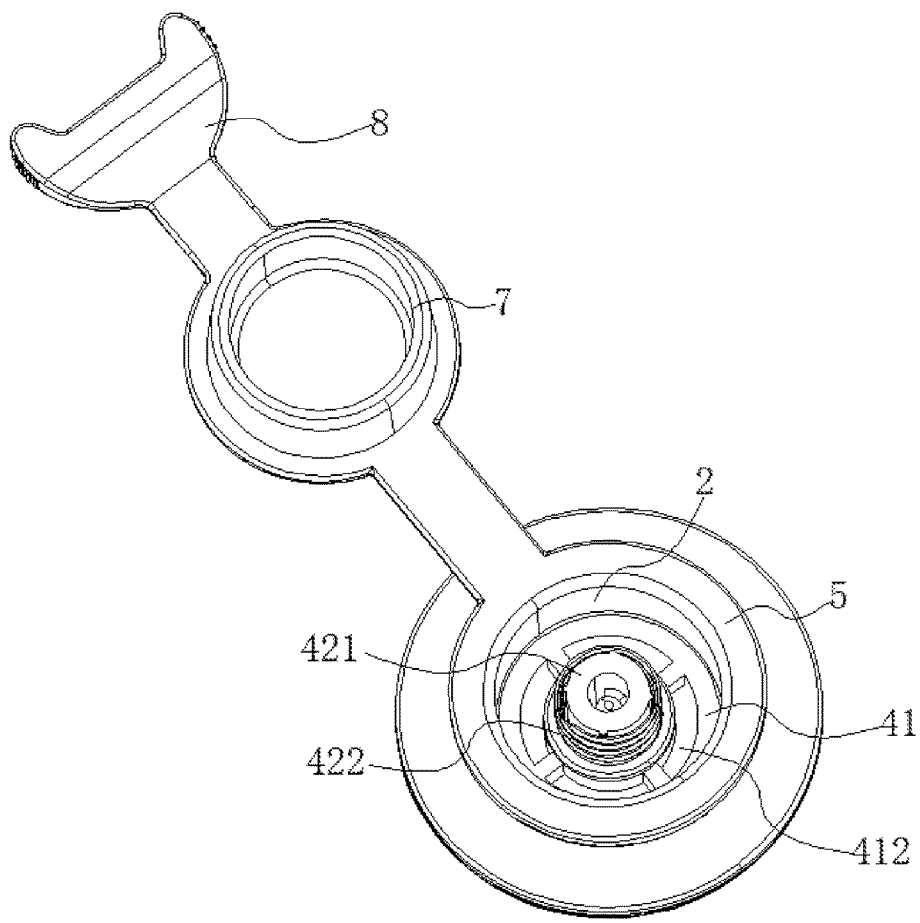
FIG. 4 is a schematic structural diagram from another view of an inflation tube and a non-return mechanism in an embodiment of an inflation apparatus provided in the present disclosure.
Figure 5:
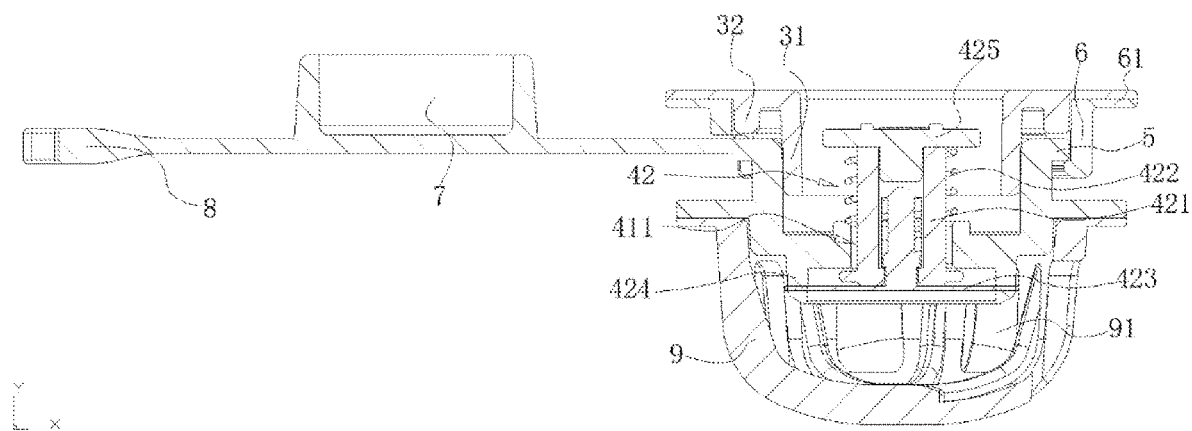
FIG. 5 is a schematic diagram of an internal structure in an embodiment of an inflation apparatus provided in the present disclosure.

With reference to FIG. 3 to FIG. 5, embodiment 2 of an inflation apparatus provided in the present disclosure is shown, the present embodiment differs from embodiment 1 in that the inflation tube 2 is connected with a plug 7 for plugging the inflation tube 2; the inflation tube 2 is further provided with a pressing member 8 which is an elastic pressing member, and a diameter of the pressing member 8 is greater than a diameter of the inflation tube 2.

The plug 7 is cylindric; a diameter of the plug 7 is slightly greater than the diameter of the inflation tube 2, and the plug 7 and the pressing member 8 are both made of a rubber material, such that the plug 7 can deform to be plugged into the inflation tube 2, and the inflation tube 2 is sealed by the plug 7, achieving effect of avoiding air leakage of the inflatable product during use. The pressing member 8 is shaped like pincers; in the present embodiment, the pressing member 8 and the plug 7 are both disposed on an elastic strip made of a rubber material. In other embodiments, the pressing member 8 and the plug 7 can also be respectively disposed on different elastic strips. When the inflatable product needs to be deflated, a force is applied to the pressing member 8 to make the pressing member 8 deform so that the pressing member 8 can be inserted to the inflation tube 2 until the pressing member 8 pushes the valve element 421 and the elastic sheet 423 is out of the state of plugging the through opening 411; then, the force applied to the pressing member 8 is canceled, and at the moment, the pressing member 8 tries to restore to an initial state due to its elastic force, whereas the diameter of the pressing member 8 is greater than the diameter of the inflation tube 2, so that the pressing member 8 can be clamped in the inflation tube 2 and maintained in the current deformed state, and thus the through opening 411 is maintained in an open state all the time, At the moment, the user can press or squeeze the inflatable product to make the gas therein escape from the inflation tube 2; during deflation, the inflation tube 2 can be kept in the open state without continuous intervention operation from the user, so that convenience and labor saving are achieved; and the pressing member 8 is connected to the inflation tube 2 so as to be convenient for the user to find and use.

Embodiment 3

With reference to FIG. 3 and FIG. 5, embodiment 3 of an inflation apparatus provided in the present disclosure is shown, the present embodiment differs from embodiment 2 in that a protective cover 9 is disposed below the elastic sheet 423, and the elastic sheet 423 is located in the protective cover 9; and a window 91 is formed in the protective cover 9. The projective cover 9 is hemispherical and is disposed below the spacer plate 41, and the window 91 of the protective cover 9 is disposed for allowing a gas to pass through without affecting inflation or deflation. By disposing the protective cover 9, the situation that the elastic sheet 423 is squeezed by an external force to deform can be avoided, it is ensured that the elastic sheet 423 keeps its shape all the time, and then, it is ensured that the plugging assembly 42 can effectively work. The top of the protective cover 9 is provided with an annular plate, an outer wall of the inflation tube 2 is also provided with an annular plate, and the inflatable product is clamped between the annular plate on the top of the protective cover 9 and the annular plate of the inflation tube 2 and is fixed by means of hot melting.

Obviously, the above-mentioned embodiments of the present disclosure are only examples for clearly illustrating the present disclosure, but are not intended to limit implementations of the present disclosure. For those of ordinary skill in the art, other changes and variations in different forms can also be made on the basis of the above-mentioned description. All the implementations need not to be, and cannot be, exhaustive. Any modifications, equivalent substitutions, improvements, etc. made within the spirit and principle of the present disclosure should fall within the protection scope of the claims of the present disclosure.

The invention claimed is:

1. An inflation apparatus, comprising:
an inflation bag and an inflation tube configured to be mounted on a to-be-inflated product; one end of the inflation bag being disposed to be open, and another end of the inflation bag being provided with a connecting nozzle used for being engaged with the inflation tube; and a non-return mechanism being provided inside the inflation tube, wherein the inflation tube and the connecting nozzle are provided with a clamping assembly, and the connecting nozzle is clamped to the inflation tube by the clamping assembly, wherein the clamping assembly comprises a flange and clamping jaws; the flange is disposed on an outer side wall of the inflation tube; and the clamping jaws configured to be clamped on the flange are provided on the connecting nozzle.

2. The inflation apparatus of claim 1, wherein the non-return mechanism comprises a spacer plate and a plugging assembly; the spacer plate is provided with inflation inlets; the plugging assembly is disposed on the spacer plate; when no airflow is introduced to the inflation tube, the plugging assembly is in a state of plugging the inflation inlets, and when an airflow is introduced to the inflation tube, the plugging assembly is out of the state of plugging the inflation inlets.

3. The inflation apparatus of claim 2, wherein the plugging assembly comprises a valve element, an elastic member, and an elastic sheet; a through opening is provided in the spacer plate; the valve element penetrates into the through opening, the elastic sheet is disposed on a bottom of the valve element, one end of the elastic member is connected to a top of the valve element, and another end of the elastic member is disposed on the spacer plate; and when the elastic member is not subjected to an external force, the valve element enables the elastic sheet to be kept in a state of plugging the through opening under action of an elastic force of the elastic member.

4. The inflation apparatus of claim 3, wherein the plugging assembly further comprises a protruding ring disposed on a bottom of the spacer plate, the through opening and the inflation inlets are both located in the protruding ring, and the elastic sheet abuts against the protruding ring.

5. The inflation apparatus of claim 3, wherein the elastic member is a spring; the elastic member is sleeved on the valve element; the top of the valve element is provided with a pressing plate, and an cross-sectional area of the pressing plate is greater than an cross-sectional area of the valve element; one end of the elastic member abuts against the pressing plate, and another end of the elastic member is abuts against the spacer plate.

6. The inflation apparatus of claim 3, wherein the inflation tube is connected with a plug for plugging the inflation tube; the inflation tube is further provided with a pressing member, the pressing member is an elastic pressing member, and a diameter of the pressing member is greater than a diameter of the inflation tube.

7. The inflation apparatus of claim 3, wherein a protective cover is disposed below the elastic sheet, and the elastic sheet is located in the protective cover; and a window is provided in the protective cover.

8. The inflation apparatus of claim 1, wherein the connecting nozzle comprises an inserting part and a limiting part; the clamping jaws are disposed on an outer side wall of the limiting part; the limiting part is located on an outer side of the inserting part; and when the connecting nozzle is connected to the inflation tube, the inserting part inserts into the inflation tube, and the limiting part abuts against an top of the inflation tube.

* * * * *